United States Patent [19]

Tachibana et al.

[11] 3,867,752

[45] Feb. 25, 1975

[54] TUBE-INSERTING APPARATUS

[75] Inventors: Keiji Tachibana, Tokyo; Toru Watanabe, Ebina; Hisao Tamura, Kawasaki, all of Japan

[73] Assignee: Hitachi, Ltd., Tokyo, Japan

[22] Filed: July 2, 1973

[21] Appl. No.: 375,819

[30] Foreign Application Priority Data
July 3, 1972 Japan................................ 47-59522
July 3, 1972 Japan................................ 47-59524

[52] U.S. Cl............................................. 29/202 R
[51] Int. Cl.............................................. B23p 15/26
[58] Field of Search.......... 29/202 R, 202 D, 200 R, 29/200 A

[56] References Cited
UNITED STATES PATENTS
3,406,838 10/1968 Davidson.......................... 29/202 R

*Primary Examiner*—Thomas H. Eager
*Attorney, Agent, or Firm*—Craig & Antonelli

[57] ABSTRACT

An apparatus for inserting tubes into a shell casing in the manufacture of a heat exchanger of the shell-and-tube type, comprising a tube-supporting bed which is laterally and vertically movable for proper alignment with the holes of tube-supporting sheets in the shell, a plurality of guide rollers forming V-shaped tube passages on the tube bed, a tube pusher cooperative with the guide rollers, and a feeder for automatically feeding tubes to the guide roller arrangement. The tube bed has stoppers that can rise and fall to enable the tubes to be coupled with pilots before insertion. The tube pusher has controls for stopping its movement when the driving torque is excessive. The tube feeder is provided with a loading mechanism having controls, tube position detectors and tube-receiving recesses which are adapted to be turned upside down to face the guide rollers.

4 Claims, 6 Drawing Figures

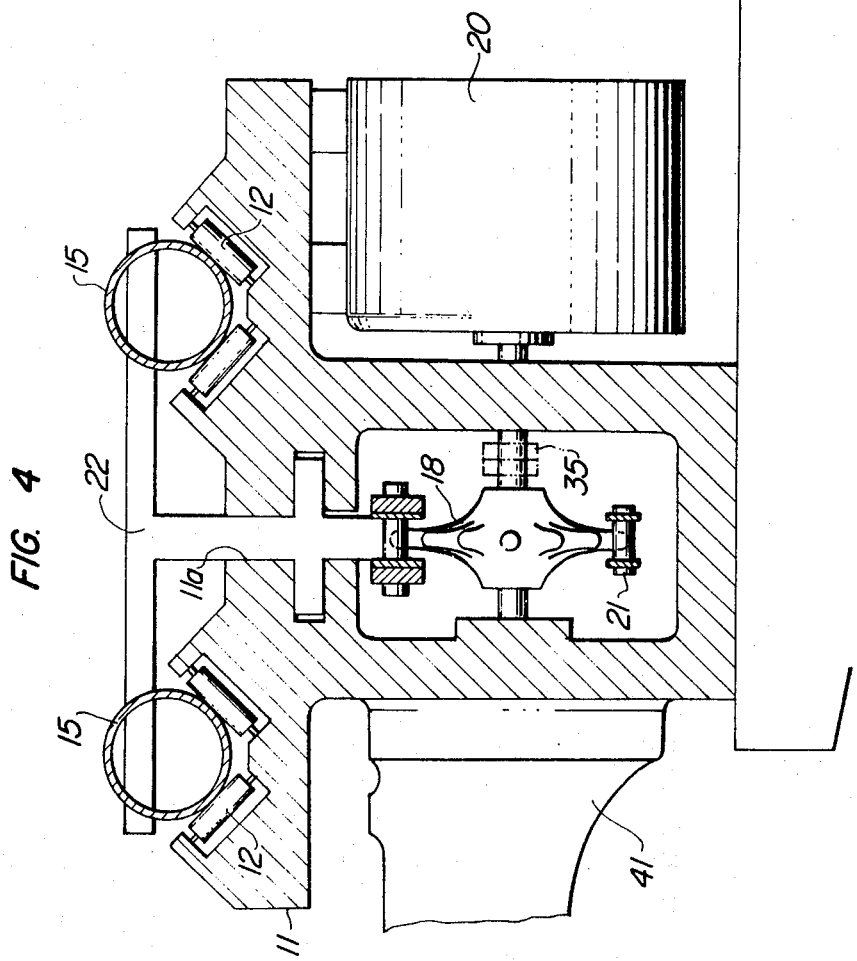

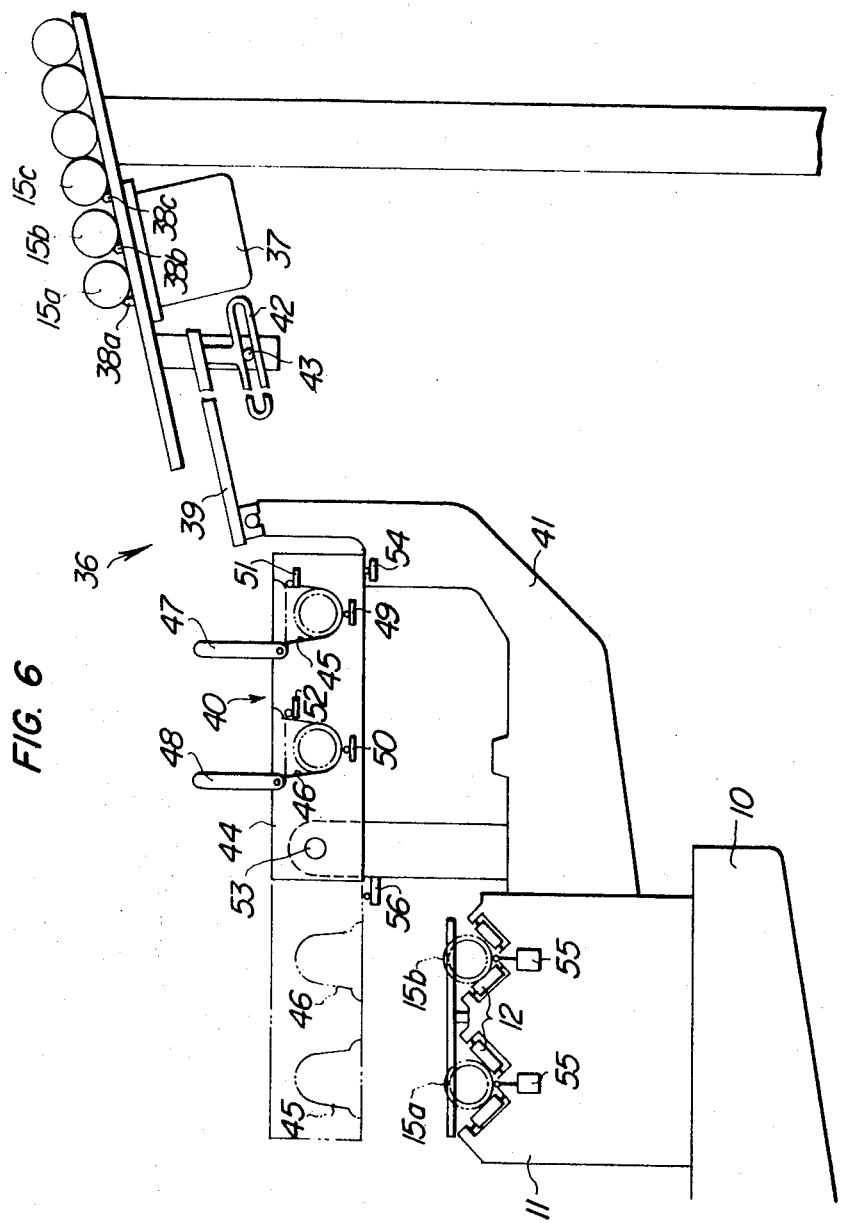

TUBE-INSERTING APPARATUS

This invention relates to an apparatus for inserting bundless of heat-transfer tubes (hereinafter called a tube bundle) into a shell in the manufacture of a heat exchanger, e.g. of the shell-and-tube type.

Heretofore, the insertion of the tube bundle has been manually performed and, therefore, at a very low efficiency. For instance, where tens of tubes several meters long are to be introduced into a shell, much time, skill and labor will be required, with a consequent increase in the assembling cost.

In view of this, the present invention has for its object to mechanize and automatize most of the insertion work, thereby saving the labor and achieving an improved assembling efficiency.

According to the present invention, a tube-inserting apparatus is provided which characteristically comprises a tube bed which is made movable vertically as well as laterally with respect to the direction in which tubes are to be inserted into a shell, a plurality of tube guide means located parallelly on the tube bed in the direction of tube insertion, tube-pushing means reciprocably provided on the tube bed to cooperate with the tube guide means, and means for automatically feeding tubes to said tube guide means.

These and other objects, features, and advantages will become apparent from the following description in connection with the accompanying drawings in which:

FIG. 4 is a sectional view taken along the line IV—IV of FIG. 3;

FIG. 6 is an end view as seen in the direction of an arrow VI in FIG. 3.

Figure 1:
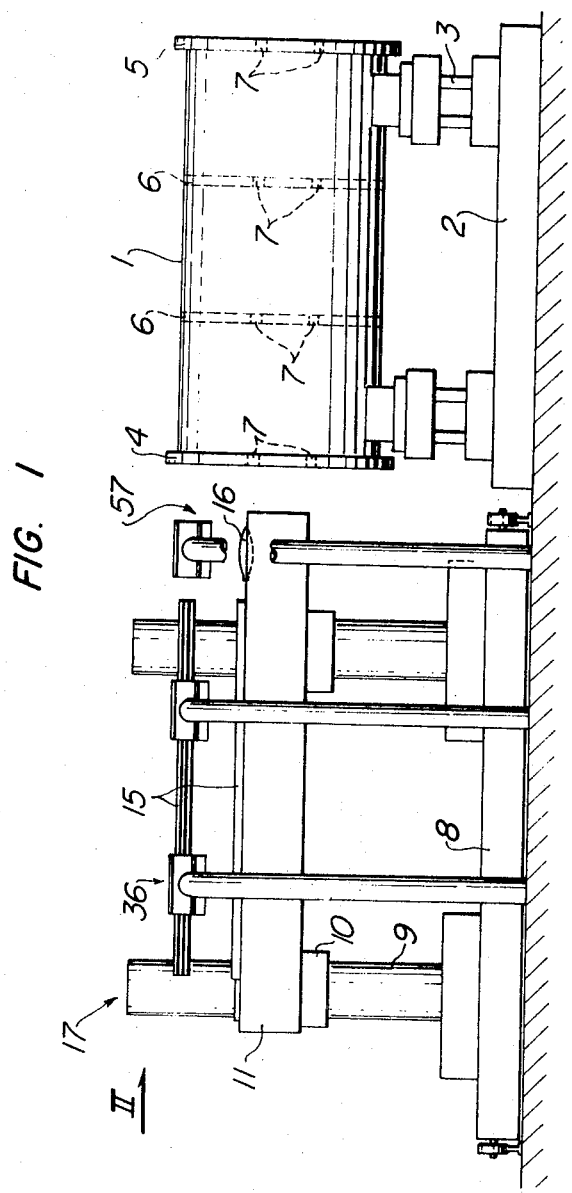
FIG. 1 is a diagrammatic side view of a tube-inserting apparatus embodying the invention, in operation.
Figure 2:
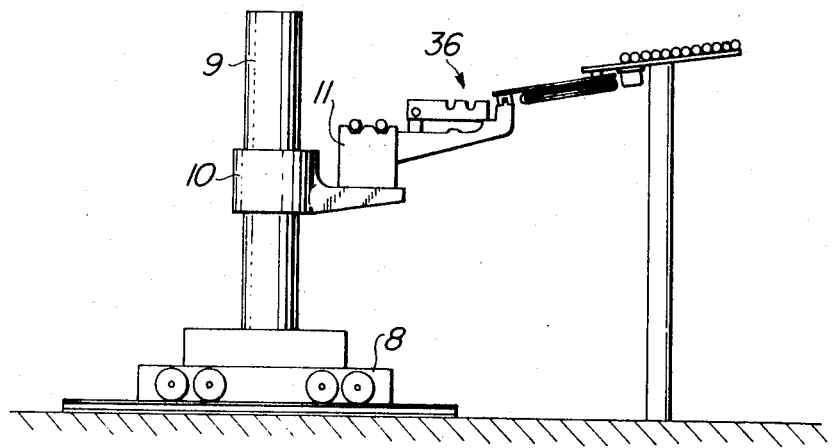
FIG. 2 is an end view as seen in the direction of an arrow II in FIG. 1.

Referring now to FIGS. 1 and 2, there is shown a shell 1 of a heat exchanger placed on a base 2 through support legs 3. Tube sheets 4, 5 at both ends and intermediate sheets 6 have several to several ten holes 7 each.

Figure 3:
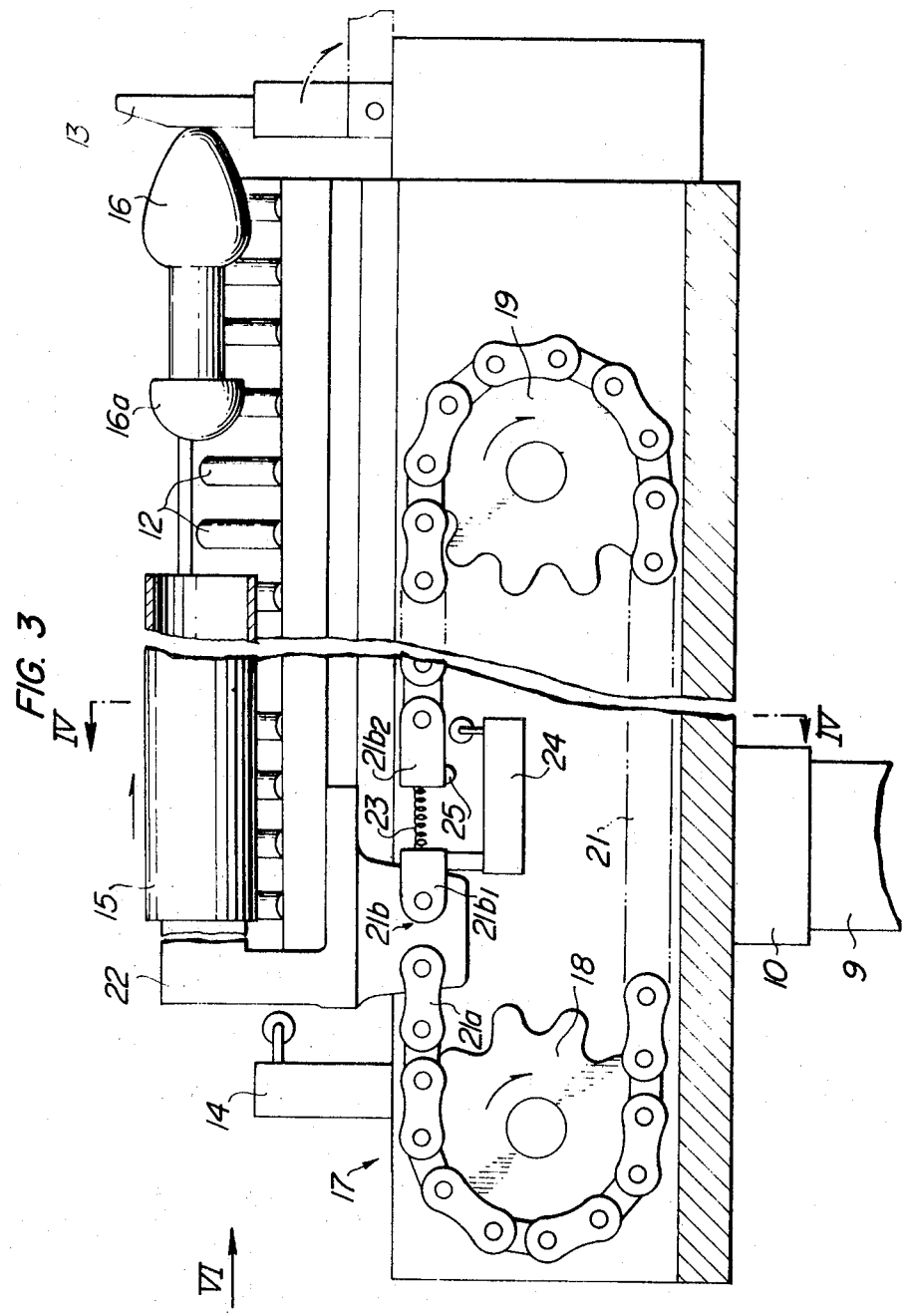
FIG. 3 is a fragmentary sectional view of the essential parts of the tube-inserting mechanism.

Brackets 10 for jointly supporting a tube bed 11 are vertically movably secured to a pair of posts 9, which in turn are fixedly supported by base 8 movable in the direction normal to or laterally with respect to the direction in which the tubes are inserted into the shell 1. As better shown in FIGS. 3 and 4, the tube bed 11 carries four rows of guide rollers 12 forming two V-shaped guide passages for tubes, each of the guide passages being provided with a stopper 13 and a limit switch 14. A tube drive, generally indicated at 17, is designed to force the tubes on the guide passages forward. Tubes 15 to be inserted through the holes 7 of the sheets in the shell and substantially dumbbell-shaped pilots 16 for tube insertion are placed over the guide rollers 12, with a suitably spaced relationship between each tube and the associated pilot.

The tube drive 17 comprises a driving sprocket 18 to be driven by a motor 20, a driven sprocket 19, an endless chain 21 extended around the both sprockets 18, 19, and a tube pusher 22 secured to links 21a, 21b of the chain 21. The lower part of the pusher 22 is adapted to slide through a guide slit 11a formed in the bed 11.

The link 21b of the chain consists of two link pieces $21b_1$ and $21b_2$ connected to each other by a spring 23. The link piece $21b_1$ is associated with a limit switch 24 for detecting the stretch of the spring.

The operation of the apparatus will now be described. By way of illustration it is assumed that tubes 15 from a tube feeder to be mentioned later lie on the guide rollers 12 of the bed 11, and that the tubes 15 have already been centered, by the lateral movement of the base 8, to the holes 7 of the sheets in the shell through which the tubes are to be inserted.

By means of the brackets 10 the tube bed 11 is raised or lowered to a suitable level where the centers of the tubes 15 are aligned to those of the holes 7. Then, the chain 21 is driven by the sprockets 18, 19, so that the tube pusher 22 can push the tubes 15 forward (rightward as viewed in FIG. 3). As the tubes 15 come in contact with the rounded rear ends 16a of the tube-inserting pilots 16 which are kept from moving by the stoppers 13, the front ends of the tubes are readily forced over the rear ends 16a, and abut the shoulders of the front large-diameter portions of the pilots thus the tubes and pilots are coupled together, one for each.

After the coupling the tubes 15 are further urged rightward until the pressure against the stoppers 13 exceeds a certain predetermined value, when the stoppers yield and give way to the tubes. The tubes then continue to advance through the holes 7, until they reach stoppers not shown located on the farther end of the shell 1 of the heat exchanger. The tube pusher 22 is stopped, too, but the chain 21 carrying it is continuously driven by the sprocket 18, and the spring 23 is stretched. As the stretch of the spring exceeds a predetermined value, a striker 25 provided on the link piece $21b_2$ actuates the limit switch 24 to bring the sprocket 18 to a stop.

Next, the sprocket 18 is driven in the reverse direction, carrying the chain 21 backward (leftward) and causing the tube pusher 22 to return to its original position. The return is detected by the limit switch 14 and the sprocket 18 is stopped thereby. At the same time, the next tubes from the tube feeder to be described later are fed, together with tube-inserting pilots, onto the guide rollers 12. In parallel with this, the centering of the tube bed, that is, the lateral movement of the base 8 and/or the vertical movement of the tube bed, is carried out relative to the holes 7 of the tube-supporting sheets in the shell through which the next tubes are to be inserted. From then on, the aforedescribed procedure is repeated.

Should a tube 15 fail, for any reason, to pass through the corresponding hole 7 of either tube sheet 4 or 5 or either intermediate sheet 6 but be kept from advancing by any such sheet, the tube pusher 22 would be stopped, too. When this happens, the chain 21 being driven forward by the sprocket 18 strecthes the spring 23 until a predetermined stretching limit is exceeded, where the striker 25 on the link piece $21b_2$ causes the limit switch 24 to stop the sprocket 18. In this way the tubes and the sheets to support them in the shell casing are protected against damaging, and other troubles that may otherwise take place are prevented.

Figure 5:
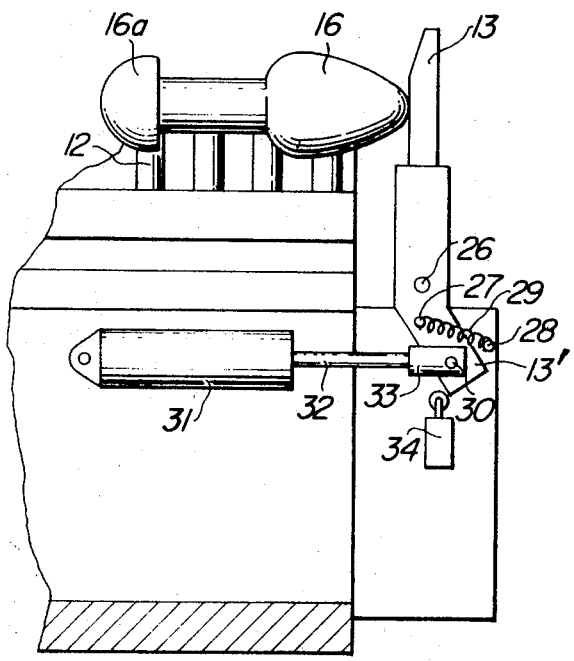
FIG. 5 is a fragmentary view of the essential parts of FIG. 3.

The rise-and-fall motion of the stopper 13 may, for example, be effected by an arrangement shown in FIG. 5. In this figure, the stopper is pivoted at 26 and has an arm 13' thereunder which is extended obliquely frontward. Between a pin 27 on the upper part of the arm 13' and a pin 28 on the tube bed, a tension spring 29 is stretched to keep the stopper 13 upright. A pin 30 provided near the lower end of the arm 13' is pivotally connected to a U-shaped connector 33 secured to the front end of a piston rod 32 of a hydraulic cylinder 31, which in turn is pivotally supported at the rear end by the tube bed. Beneath the arm 13' is installed a limit switch 34. In the manner already described, the tubes 15 are urged forward by the tube pusher 22 until the rounded rear ends 16a of the tube-inserting pilots gain entrance into the front ends of the tubes. Here only frictional forces work, and the springs 29 are so chosen that their tension is high enough to overcome the frictional forces and keep the stoppers 13 upright. As the tubes 15 continue to advance, the stoppers 13 are forced down by the pilots 16 partly fitted in the front ends of the tubes. When each stopper begins to fall in this way, the lower end of its arm 13' comes into contact with the limit switch 34 and enables the latter to actuate the hydraulic cylinder 31. As a result, the piston rod 32 is withdrawn and the stopper is kept in its down position. When the tubes have been inserted and the tube pusher 22 has returned to its original position, the limit switches 14 (FIG. 3) are closed and again the hydraulic cylinders are actuated, this time extending their piston rods 32 and bringing the stoppers 13 back to their upright positions.

In the construction described above, the chain links are provided with the spring and limit switch so that, when the torque with which the chain is driven has exceeded a predetermined level, the spring is stretched and the limit switch is actuated to stop the sprockets. It is possible, as an alternative, to install a clutch 35 as indicated by chain lines in FIG. 4 between the driving power source and the driving sprocket and enable the clutch to slip and bring the sprocket to a stop upon the rise of the sprocket-driving torque above the predetermined level.

A tube feeder 36 for automatically feeding tubes 15 onto the tube base 11 will now be described with reference to the drawings, specifically FIG. 6.

As shown, a tube-feeding mechanism 37 having controls is provided with a plurality of retractable stoppers 38a, 38b, 38c, which are adapted to draw in and out of a table in succession to permit tubes 15a, 15b, and so forth to roll down via an auxiliary tiltable table 39 onto a loader 40. One end of the auxiliary table 39 is pivotally supported by the front end of a sidewise extension or support arm 41 of the tube bed 11. The other end of the table is supported by a pin 43 which is secured to a suspended strip of the tube-feeding mechanism and is engaged with the slot of a generally coathanger-shaped guide member 42 secured to the underside of the tiltable table.

The loader 40 comprises a tube-carrying arm 44 having a plurality of tube-supporting recesses 45, 46 (the embodiment shown having two such recesses), hinged covers 47, 48 for opening and closing the recesses respectively, position detectors 49, 50 for detecting the entry of the tubes into the recesses 45, 46, and position detectors 51, 52 for detecting the closing of the covers 47, 48. The tube-carrying arm 44 is pivotally connected to the support arm 41 in such a way that it can turn 180° about a pin 53.

The support arm 41 is provided with a position detector 54 for the tube-carrying arm 44. The tube bed 11 has tube position detectors 55, each between two rows of guide rollers 12 in a letter V formation. The loader 40 is arranged in such a manner that when it is turned 180° or upside down its tube-supporting recesses 45, 46 are located immediately above the V-shaped rows of guide rollers.

If the loader 40 is set in the position indicated by solid lines, it contacts the position detector 54, and in response from a signal from the detector the stopper 38a of the tube-feeding mechanism 37 recedes. This permits the tube 15a to roll down into the recess 45 of the arm of the loader 40. The tube's entry is detected by the position detector 49, which in turn enables the cover 47 to turn down from the vertical open position to the horizontal closing position. This is detected by the position detector 51 and the tube-feeding mechanism is thereby ordered to feed another tube. Upon receipt of this order, the feeding mechanism retracts the stopper 38b, allowing the tube 15b to roll down, along the auxiliary tiltable table 39 and over the cover 47 of the tube-carrying arm 44, into the recess 46. The position detector 50 detects this and causes the cover 48 to turn down from the vertical open position to the horizontal closing position. The closing is detected by the position detector 52 and, in response to the signal from the detector, the stopper 38a of the tube-feeding mechanism 37 is caused to protrude.

Simultaneously with this, the tube-carrying arm 44 is turned 180° counter-clockwise about the pivot 53 and is held in position where its recesses 45, 46 are opposed to the V-shaped rows of guide rollers of the tube bed. At the point where the arm 44 begins to turn counter-clockwise, the stopper 38c of the tube-feeding mechanism 37 is caused to recede in response to the signal from the position detector 51. Therefore, the third and subsequent tubes roll down until they are stopped by the protruding stopper 38a.

The upside-down position of the arm 44 is detected by another position detector 56 and the covers 47, 48 are turned open, allowing the tubes 15a, 15b to drop into the V-shaped passageways of guide rollers 12.

The tube positions are detected by the detectors 55, and in response to their signals, the tube-carrying arm 44 is turned clockwise to its original position. In the meantime the tubes are inserted through the holes of sheets in the shell by the tube-drive 17, and the tube bed is moved laterally and or vertically for alignment with the other holes 7 of the shell to be filled next. The return of the arm 44 is detected by the position detector 54, and the tube-feeding mechanism 37 is thereby ordered to feed new tubes. Thus, the stoppers 38b, 38c protrude to keep tubes from descending, while the stopper 38a retracts and allows the tube thereon to roll down into the loader 40. From then on the foregoing procedure is repeated and tubes are fed to the tube base.

The tube-inserting pilots 16 can also be fed automatically to the tube bed by a feeder 57 (FIG. 1) similar to the tube feeder 36 above described.

Suitable controls may be provided, according to the sequence of tube insertion into a shell of a particular heat exchanger, to control the operations of means (not shown) for laterally moving the base 8 and for vertically moving the tube bed 11, and also to control the timed and related operations of the tube drive 17, tube feeder 36, and tube-inserting pilot feeder 57. The use of such controls on the principles of the present invention makes possible the provision of a completely automatized tube-inserting apparatus except for the placement of tubes and tube-inserting pilots on the respective feeders.

As has been described above, the present invention renders it possible to perform a series of operations including the feeding of tubes from the tube feeder, loading of the loader with tubes, and receipt and insertion of tubes by the tube-inserting mechanism smoothly and automatically with no need of labor. The invention thus permits, in addition to the saving of labor, an improvement of operational efficiency and a remarkable reduction of the cost required for the insertion of tubes into a shell in the assembling of a heat exchanger.

We claim:

1. A tube-inserting apparatus comprising a tube bed which is laterally and vertically movable relative to the direction in which tubes are inserted into a mating shell, a plurality of tube-guiding means arranged in parallel on the tube bed along the direction of tube insertion, tube-pushing means provided reciprocably on the tube bed for cooperation with the tube-guiding means, and means for automatically feeding tubes to the tube-guiding means.

2. A tube-inserting apparatus as defined in claim 1 wherein the tube bed is equipped with retractable stoppers, and a tube-inserting pilot is located on the tube bed in front of each of the tubes, and means for automatically feeding said tube-inserting pilots to the tube-guiding means is provided.

3. A tube-inserting apparatus as defined in claim 1 wherein the tube-pushing means is provided with means for controlling the same in such a way that, if the torque for driving the tube-pushing means exceeds a predetermined value, the same means is stopped.

4. A tube-inserting apparatus as defined in claim 1 wherein the tube-feeding means includes a feeding mechanism having controls, and a loading mechanism having a plurality of tube position detectors and tube-receiving recesses so that when the loading mechanism is turned upside down the recesses are opposed to the tube-guiding means, said loading mechanism and tube-guiding means being provided with their position detectors which coact with the tube-position detectors of the loading mechanism to feed tubes to the tube-guiding means via the feeding and loading means.

* * * * *